United States Patent
Chow et al.

(10) Patent No.: US 8,195,170 B2
(45) Date of Patent: Jun. 5, 2012

(54) PROJECT PLANNING DATABASE FOR PROSPECTIVE WIRELESS NETWORKING SITES

(75) Inventors: Gary Chow, Irvine, CA (US); Michael A. Sprecher, Corona, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 1269 days.

(21) Appl. No.: 11/871,709

(22) Filed: Oct. 12, 2007

(65) Prior Publication Data

US 2008/0102803 A1    May 1, 2008

Related U.S. Application Data

(60) Provisional application No. 60/863,226, filed on Oct. 27, 2006.

(51) Int. Cl.
*H04M 3/42* (2006.01)

(52) U.S. Cl. ...................... 455/446; 455/414.2; 707/882

(58) Field of Classification Search .................. 455/446, 455/466, 414.2; 707/200, 822, 652, 609
See application file for complete search history.

(56) References Cited

U.S. PATENT DOCUMENTS

2006/0129607 A1 * 6/2006 Sairo et al. .................... 707/200
* cited by examiner

*Primary Examiner* — Phuoc Doan
(74) *Attorney, Agent, or Firm* — Turocy & Watson, LLP

(57) ABSTRACT

A search ring generation system comprises a receiver component that receives indicia that can be utilized to identify a proposed cell site. An implementation component automatically creates a search ring with respect to the proposed cell site. A search ring as used herein is defined as a document that formally begins an approval process for proposed wireless cell sites. In addition, pertinent information such as justification plots, GIS and satellite maps, and cell site approval information of an organization can be compiled, tracked, and/or incorporated into a summary report for the search ring. As a result, a query for a particular search ring can identify not only the cell site but the additional pertinent information as well.

20 Claims, 18 Drawing Sheets

| Administrative | Search Ring | Justification Plot | Coverage Objective | Support Documents | Internet Map |

Site Info
- Site ID: NL5555
- Site Name: NONE

Database Functions
- Search for Site ID: [ ]
- Export Database

Approval List
- Market: [ ]  Regional: YES  National: [ ]
- NPV: [ ]  Director: [ ]  Site Acq: [ ]
- Reject Site Budget Information
- Date: Pending
- Build Yr: TBD
- Phase Info: TBD Administrative Comments:
NONE

1500

| Administrative | Search Ring | Justification Plot | Coverage Objective | Support Documents | Internet Map |

Site Info

| | | | |
|---|---|---|---|
| Site ID: | NL5555 | Antenna Config: | Sector |
| Site Name: | NONE | Site Type: | Infill |
| Latitude | 34.1566 | BTS Type | Microcell |
| Longitude | -118.4366 | | |
| Ground Elevation | 656 | Sector A Azimuth | 100 |
| ERP (Watts) | 0 | Sector B Azimuth | 220 |
| Radiation (ft) | 60 | Sector C Azimuth | 340 |

Engineering Information

| | |
|---|---|
| Engineer: | Kam Aura |
| Zone: | 2A |
| District: | |
| Manager: | Tom Travers |

Engineering Comments:
Provide In-Building Coverage for City Square Mall in Oakstown, CA

Administrative Comments:
NONE

Structure Area Requirements

| | |
|---|---|
| Min Height(AMSL): | 716 |
| Max Height(AMSL): | 2A |
| Structure Type: | 2 |

Calculated Info:

| | |
|---|---|
| Latitude: | 34.15 |
| Longitude: | -118 |
| Market: | Oakstown |
| County | Yellow County |
| City: | Oakstown |
| Zip Code: | 00000 |
| Version: | Preliminary |
| Creation Date: | 10/27/2006 |
| Morphology: | Urban |
| Site prefix: | NL |

SITE MAP

PROJECT PLANNING DATABASE FOR PROSPECTIVE WIRELESS NETWORKING SITES

CROSS REFERENCE TO RELATED APPLICATION

This application claims the benefit of U.S. Provisional Patent Application No. 60/863,226, filed on Oct. 27, 2006, entitled PROJECT PLANNING DATABASE FOR PROSPECTIVE WIRELESS NETWORKING SITES, the entirety of which is incorporated herein by reference.

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's portable phones (and other portable devices) can be utilized as full-service computing machines. For example, many of the most recent and advanced mobile phones can be associated with word processing software, accounting software, and various other types of software. Furthermore, network coverage has expanded to cover millions, if not billions, of users. Additionally, mobile phones have decreased in both size and cost. Specifically, modern mobile phones are often small enough to slip into an individual's pocket without discomforting the individual. Furthermore, many mobile network service providers offer phones at extremely low cost to customers who contract for service with such providers.

To enable robust service to be provided to customers, new cellular sites must be constructed and/or purchased from other parties. Planning where to place a new cell site (or where to purchase a cell site) is an expensive (and confusing) endeavor. For instance, engineers typically go into the field and select candidate cells sites, and then submit a request for a new cell site for approval. Typically, new cell sites first need to be approved at a regional level, and thereafter at a national level (with respect to larger wireless carriers), and then subject to a financial analysis before dollars are allocated to the proposed cite. Conventionally, documents that summarize proposed projects must be manually created, which requires an inordinate amount of time. This lost time can negatively impact deployment time-sensitive new site projects and sales planning efforts. Additionally, there is currently no suitable manner for verifying technical justification for a summary document (detailing site proposals, plans, etc.) prior to generation of the document. Rather, each time a new cell site is proposed, a summary document must be manually created (that illustrates location of the site and other critical information) and justification information must be manually located. Accordingly, the current process for proposing and planning a new cell site is slow, error-prone and subject to disarray and miscommunication during heavy workloads with many emails.

SUMMARY

The following presents a simplified summary in order to provide a basic understanding of some aspects of the disclosed subject matter. This summary is not an extensive overview, and it is not intended to identify key/critical elements of the disclosed subject matter or to delineate the scope thereof. Its sole purpose is to present some concepts in a simplified form as a prelude to the more detailed description that is presented later.

Briefly described, the subject disclosure pertains to automating generation of proposal documents and/or technical justification plots relating to new cell sites. For example, a wireless carrier may wish to ensure that suitable coverage exists within a shopping mall. Conventionally, a document that is prepared to formally initiate a request for a new cell site (hereinafter referred to as a "search ring") must be manually generated, replicated, and provided to onsite engineers. This document can include information such as location of a cell site, location of antennas, height of an antenna, coverage capacity of the antenna, and other information that is relevant to a new cell site.

In contrast with conventional manual site generation, a database described herein can be organized and accessed in such a manner that search rings can be automatically created and visualized upon being provided with a location (e.g., a latitude and longitude) of a potential cell site. For instance, the database can include drive test data regarding a possible or proposed cell site, technical information, and other suitable information. The database can be utilized to create visibility and approval control for a possible cell site that is being proposed but has yet to be approved. Still further, the database not only acts as a repository for proposed projects, but can also track proposed projects, provide visibility for a status of one or more projects, provide a manner for obtaining final approval of a project, and provide a single point for transfer of information into other databases.

Therefore, the database tool described herein can enable automated creation of a search ring and associated technical justification supporting drive test plots by inputting location information. Additionally, batch processing of search rings can be enabled, as well as search ring packaging, which bundles a search ring with supporting documents. Still further, export of search ring information to other project databases for additional site justification and project tracking is enabled through utilization of the database tool described herein. Moreover, tracking of search rings from creation through all suitable approval states is enabled, wherein visibility is provided with respect to an approval process of the search ring. Finally, enforcement of a search ring justification process can be implemented to ensure that all desirable steps are undertaken and completed for each proposed new site project.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become

BRIEF DESCRIPTION OF THE DRAWINGS

FIGS. 11-19 are screenshots illustrating various embodiments described in greater detail herein.

DETAILED DESCRIPTION

Figure 1:
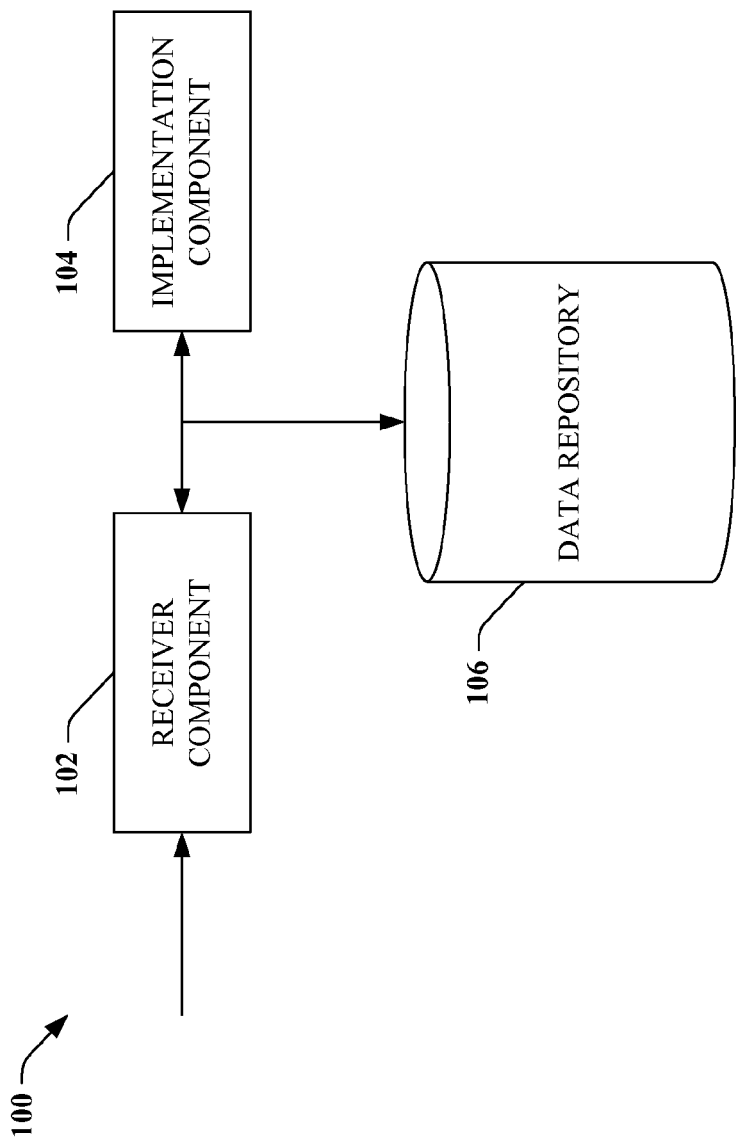
FIG. 1 is a high-level block diagram of a system that automatically outputs search rings with respect to one or more proposed cell sites.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Turning now to the drawings, FIG. 1 illustrates a system 100 that facilitates automatically providing a search ring based upon location information. More particularly, a search ring can be defined as an executive summary of a proposal for a new site for a cellular system. As used herein, a "search ring" is a document that formally initiates a request for a new cell site (e.g., a new cell site proposal in the form of a document). The system 100 includes a receiver component 102 that receives location information and, if specified, can convert the location information into a particular format. For example, the receiver component 102 can receive voice or text commands relating to a location, an address of a location, a selection of a location on a graph, latitude and longitude coordinates, or any other suitable location information. Additionally, the receiver component 102 can convert between different location types; for instance, the receiver component 102 can convert an address to a latitude/longitude coordinate.

The receiver component 102 is communicatively coupled to an implementation component 104, which can access a data repository 106 and automatically generate a search ring based at least in part upon the received location information and content of the data repository 106. Pursuant to an example, the data repository can include information relating to types of antennas, location of one or more antennas, coverage capacity, drive test information, approval requirements, individual names, map information, and other suitable information. The data repository 106 can also include information that technically justifies the proposed cell site, including engineering information and monetary information.

The implementation component 104 can access suitable information based at least in part upon received location information and automatically generate a search ring. Thus, the implementation component 104 can automatically create a document that is easily visible with respect to a new site proposal. The document can be in an electronic format (e.g., word processing, database printout, custom form, and so on), a printed hardcopy, or both. Additionally, the implementation component 104 can incorporate approval control criteria for a new cell site that has been proposed but has yet to be approved. Furthermore, the implementation component 104 can enable a plurality of proposed projects to be tracked (e.g., where each project is entered as a comma separated value (CSV) file, or like delimited file), provide visibility with respect to an approval status, action items required to advance the approval status of a search ring, a purpose of a proposed site, technical justification relating to proposed sites, enable batch processing of search rings, etc.

In additional, the implementation component 104 can be utilized for notifying a particular individual of when a cell site has been requested. Still further, the implementation component 104 can include a planning component (not shown) that generates predictions when drive test data is not existent. The implementation component 104 can cause various programs to be run in order to bundle information within a generated search ring. A recipient of the search ring therefore receives a technical justification that is associated with approved guidelines.

Figure 2:
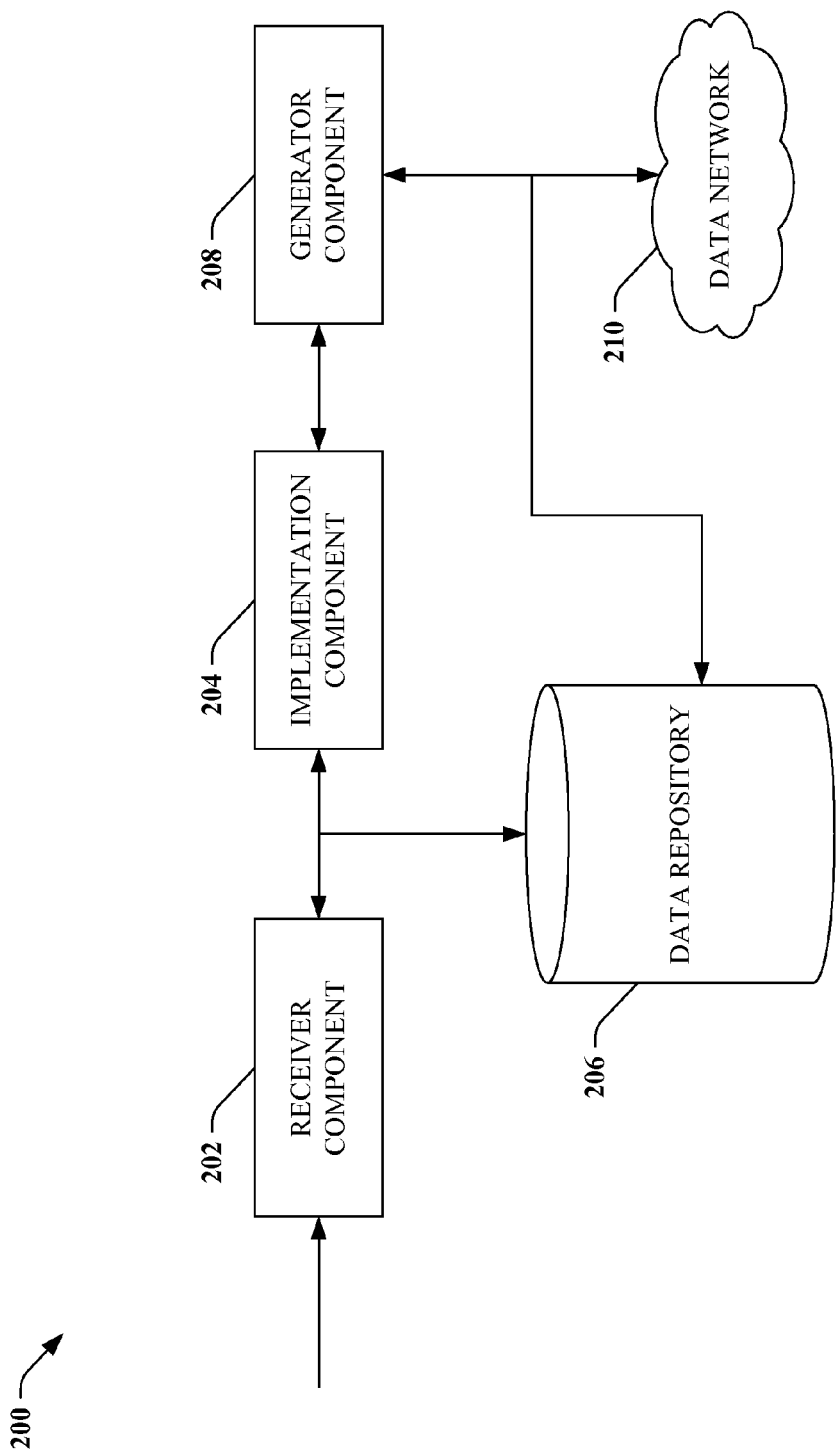
FIG. 2 is a block diagram of a system that aggregates a technical justification plot with a search ring for proposed cell sites

Referring now to FIG. 2, a system 200 is depicted that can aggregate a justification plot with a search ring in accordance with one or more aspects disclosed herein. More specifically, the justification plot, as used herein, can convey information relating to system capacity, cell site coverage, cell site infill, and other suitable justification information for the cell site. Furthermore, the justification plot can provide a technical justification for choosing a particular cell site and appropriating funds for developing the cell site.

In general, system 200 can include a receiver component 202 that accepts indicia (e.g., location information, name information, and so on) that can be utilized to identify a proposed cell site, and an implementation component 204 that can automatically create a search ring for the proposed cell site based on the indicia. Particularly, implementation component 204 can reference a data repository 206 to determine and extract information related to the cell site, such as types of antennas, location of one or more antennas, coverage capacity, drive test information, approval requirements, individual names, map information, and other suitable information.

According to particular aspects, system 200 can include a generator component 208 that can create a justification plot and associate the justification plot with the search ring. The justification plot can include information related to overhead cost, development cost, site coverage, projected revenue, and so on, with which to base a feasibility study. Additionally, the generator component 208 can access a data network 210, such as the Internet or an enterprise intranet, to search for, identify and extract business and/or consumer population information. For instance, a local news website proximate a cell site can be searched to identify businesses that are moving into an area and may need cell coverage. Municipality websites can be referenced to obtain demographic, census, and industrial/commercial/residential development information as well as future projections thereof, etc. As a result, system 200 can automatically search for and include pertinent news, demographic, and current event-related information as well as site capacity, infill and coverage information into a justification plot.

According to further aspects, generator component 208 can aggregate a justification plot, described above, with a search ring. The justification report can provide additional information pertinent to approval of a cell site. As a result, a search ring can be automatically generated that proposes development of a new cell site and also includes justification information therein. System 200 can therefore provide a substantial reduction in time over conventional mechanisms that require manual generation of a search ring and manual compilation of justification data. In light of modern desires to reduce overhead costs and time to market constraints for development of cellular services, system 200 can provide a substantial benefit over conventional approaches.

Figure 3:
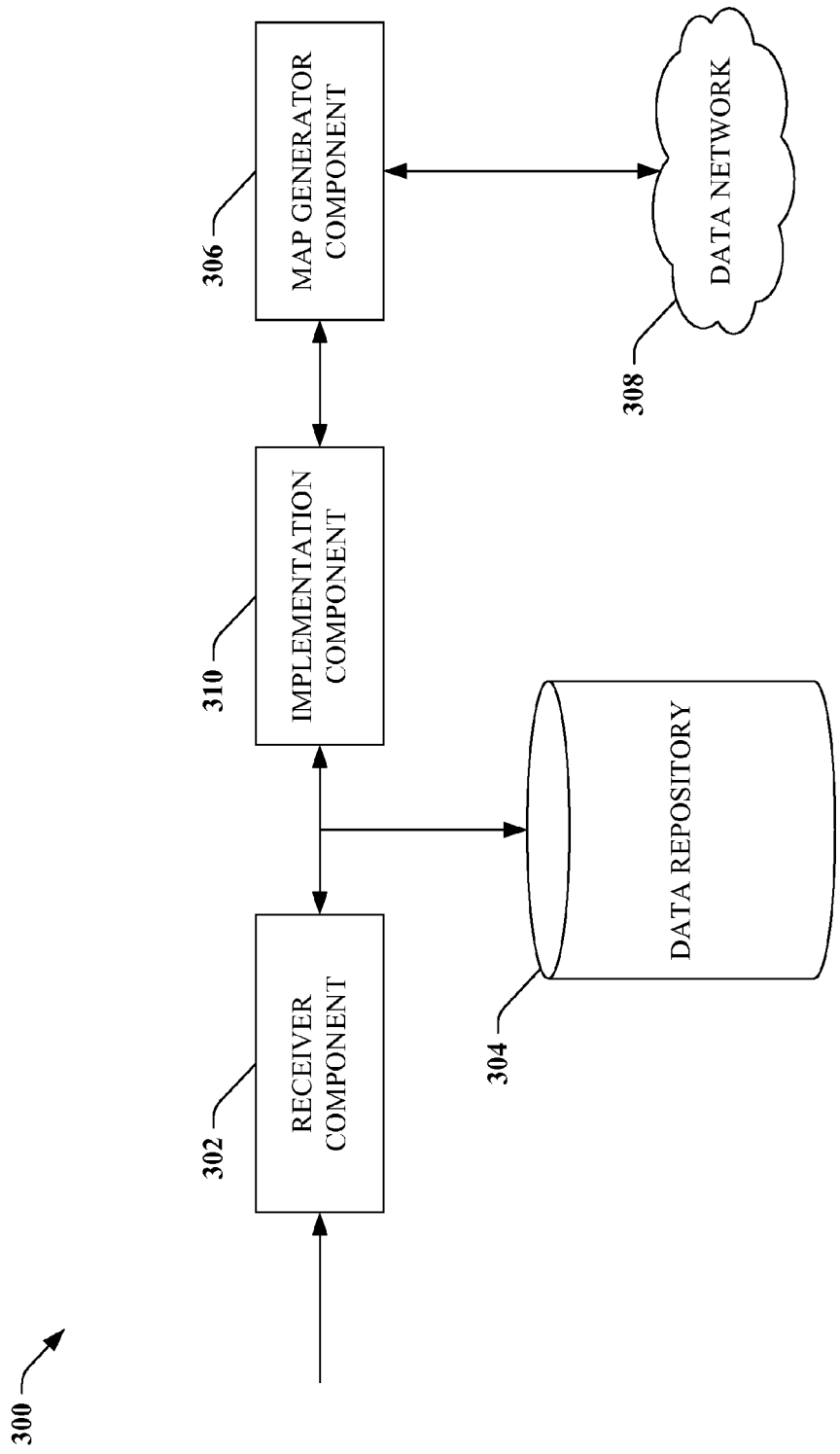
FIG. 3 is a block diagram of a system that aggregates a site map with a search ring for proposed cell sites.

Referring now to FIG. 3, an example system 300 is depicted that can aggregate a site map with a search ring for proposed cell sites according to one or more aspects disclosed herein. For instance, receiver component 302 can accept indicia identifying a location of a cell site. The indicia can include latitude and longitude coordinates, a name of a cell site, a mailing address of the cell site, and the like. According to particular aspects, receiver component 302 can convert various identifying indicia from one format to another. For example, latitude and longitude coordinates can be converted to a physical address, and vice versa. In addition, a name of a cell site can be referenced within a data repository 304 to determine latitude and longitude coordinates and/or a mailing address stored therein.

According to further aspects, system 300 can include a map generator component 306 that can create a map (e.g., satellite, topological, geographic, or geographic information system (GIS) maps, etc.) of a region associated with the search ring. The map can be a graphical representation of a physical site, including roads, physical landmarks, such as bridges, large buildings, industrial, commercial or residential population centers, topological information including changes in surface altitude, and other suitable information pertinent to air transmission (e.g., generated by universal mobile telecommunication system (UMTS) Polygon and Morphology Type, and analogous algorithms for UMTS and other cellular technologies, that classify terrain s to what type of land cover exists at various cell sites according to SiteID). In addition, the map can mark locations of current or proposed future base stations or cell towers, radio network control sites, and the like. Furthermore, the map can illustrate cell coverage areas, including indications of radio coverage strength relative to one or more base stations or towers, indications of cell breathing, where applicable, and so on. Each of the features included on the map can be labeled for reference. Such a map can be generated, for example, by various electronic GIS mapping applications that can produce such a map when provided location information of a particular site. The mapping application can be accessed by way of a data network 308 as well, such as the Internet, an enterprise intranet, and so on.

In addition to the foregoing, map generator component 306 can provide a satellite image map. More specifically, the satellite image map can be a pictorial representation of a cell site having visual images of buildings, parking lots, hills, mountains, forests, roads, bodies of water, residential areas, industrial areas, commercial complexes such as shopping malls and the like, man-made towers, and so on. The satellite map can optionally be overlaid with feature labels (e.g., feature names such as street, building, water, bridge, shopping mall names, and the like), for instance, by reference to a GIS map or map database (not shown) containing feature labels. The satellite map can be obtained by way of an interface with an imaging and mapping satellite, or by way of a data network 308 (e.g., the Internet) having satellite mapping applications.

According to further aspects of the subject disclosure, system 300 can aggregate a map, including a GIS map or satellite map, or both, with a search ring document providing a new proposal for a cell site. An implementation component 310 can receive identifying indicia from receiver component 302. The identifying indicia can be utilized to reference data repository 304 to extract information pertinent to the search ring (including, e.g., engineering feasibility data, marketing data, a justification plot, enterprise approval data, and so on) as described herein (e.g., as discussed with respect to FIG. 1, supra). Maps can include pertinent information related to operation of a cell site, including information from which air coverage and customer support can be inferred and/or calculated, and consequently having a map automatically generated and provided with a search ring can be very helpful in determining efficiency and appropriateness of a new cell site. As described, system 300 can automatically generate a cell site search ring including relevant GIS and/or satellite maps to provide pertinent information for a cell site approval process.

Figure 4:
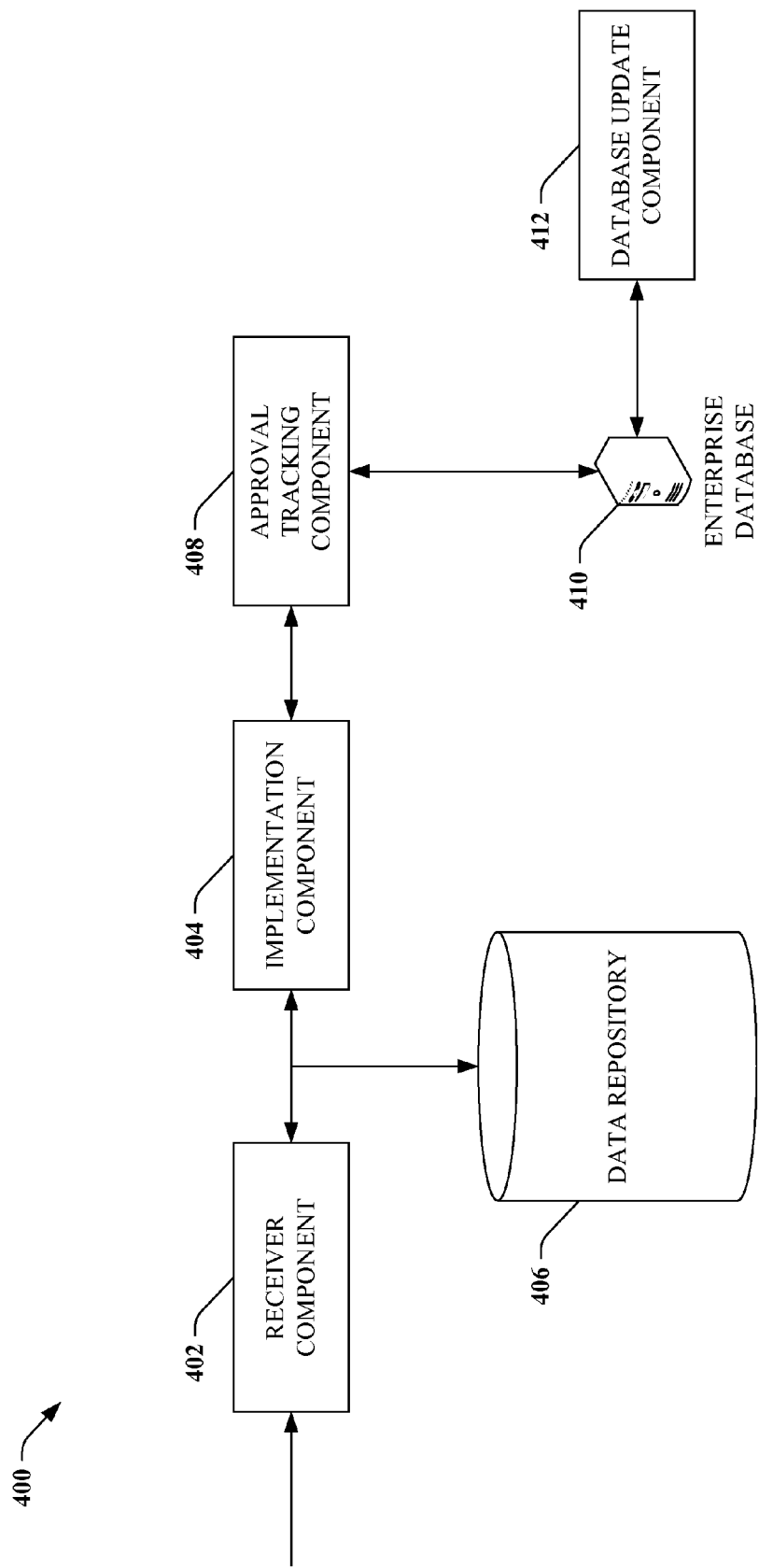
FIG. 4 is a block diagram of a system that tracks an enterprise approval process and incorporates the approval process in a summary report.

FIG. 4 illustrates a block diagram of a system that tracks an enterprise approval process and incorporates the approval process in a summary report. Additionally, the summary report can be included with a search ring (e.g., generated by way of receiver component 402, implementation component 404 and data repository 406, see FIG. 1, supra) as described herein, so that referencing the search ring will also provide an indication of concurrent enterprise approval for the search ring. A summary report, as utilized herein, can be any suitable electronic and/or printed document (e.g., word processing document, spreadsheet document, general or custom database output file, or the like), which can include a custom form organized to incorporate and present enterprise approval data.

According to certain aspects of the subject disclosure, system 400 can include an approval tracking component 408 that can update a search ring with approval information related to an approval process for the cell site. The approval process can include various levels of management consent, including regional, national, and enterprise-level consent. Typically, an approval process can also require engineering feasibility studies and related data providing a forecast of site operation and maintenance and marketing studies providing a forecast of anticipated revenues, and the like. As a result, the approval tracking component can interface with an enterprise database 410 to determine and extract suitable approval information, including market justification results, regional, national, and enterprise-level management approval, and engineering feasibility results, and combinations of these and like data. Furthermore, the summary report can be periodically updated by approval tracking component 408, to account for changes in the approval process (see below).

In addition to the foregoing, upon determining and extracting appropriate approval data, approval tracking component 408 can generate a summary report of the approval process, as it stands at a particular point in time. Periodic summary reports can be generated (e.g., daily, weekly, bi-weekly, etc.) to incorporate additional information as such information is updated to the enterprise database 410. Furthermore, approval tracking component 408 can incorporate a summary report into a cell site search ring. Moreover, links to past summary reports can be provided with the search ring as well, in order to present an indication of the approval process itself. As a result, upon identifying and retrieving a search ring, the summary report can also be retrieved.

As a particular example, a summary report can contain a hierarchy of all entities within an organization that are required to approve of a search ring. Additionally, the summary can provide a consecutive approval flow (e.g., by way of an enterprise approval flowchart) indicating an order in which the entities are to receive the search site for approval. Moreover, the summary can indicate where a particular search ring is in the approval process, which entities have approved or disapproved of it and why, and which entities are yet to receive the search ring. Consequently, system 400 can automatically track, extract and include information suitable to determine a status of an approval process within a summary report and associate such a report with the search ring.

According to still other aspects of the claimed subject matter, system 400 can include a database update component 412 that enables role-based access to a data repository (including, e.g., data repository 406 and enterprise database 412) to update technical, financial, or managerial information pertaining to the search ring. Role-based access can be defined as authorization to enter, edit and/or update cell site approval information into a data repository (hereinafter enterprise database 410 is utilized to refer to the data repository specified above) pertinent to a particular enterprise division or sub-division.

To illustrate aspects of the foregoing, divisions can include regional, national or enterprise-level management, or the like. Additionally, divisions can include engineering, marketing, sales, and so on. Sub-divisions can include radio network engineering, radio controller configuration, network maintenance, and so on. One or more entities can have a role-based access to update approval information for each division, sub-division, and the like. As a particular example, a regional manager (or, e.g., an assist of such manager) can be authorized to update enterprise database 410 with respect to regional management approval. A national manager can then be authorized to update enterprise database 410 with respect to national management approval, and so on. In general, a role, title, and/or responsibility of an entity in the enterprise can form the basis for role-based access to enterprise database 410. In a manner as described, various entities can update the enterprise database as new approval information is available, to ensure accuracy of such information. As described, system 400 can provide for compilation, extraction and dissemination of approval information in conjunction with a search ring. A substantial amount of time can be saved with respect to conventional techniques requiring manual compilation of an approval process and association with a cell site search ring.

Figure 5:
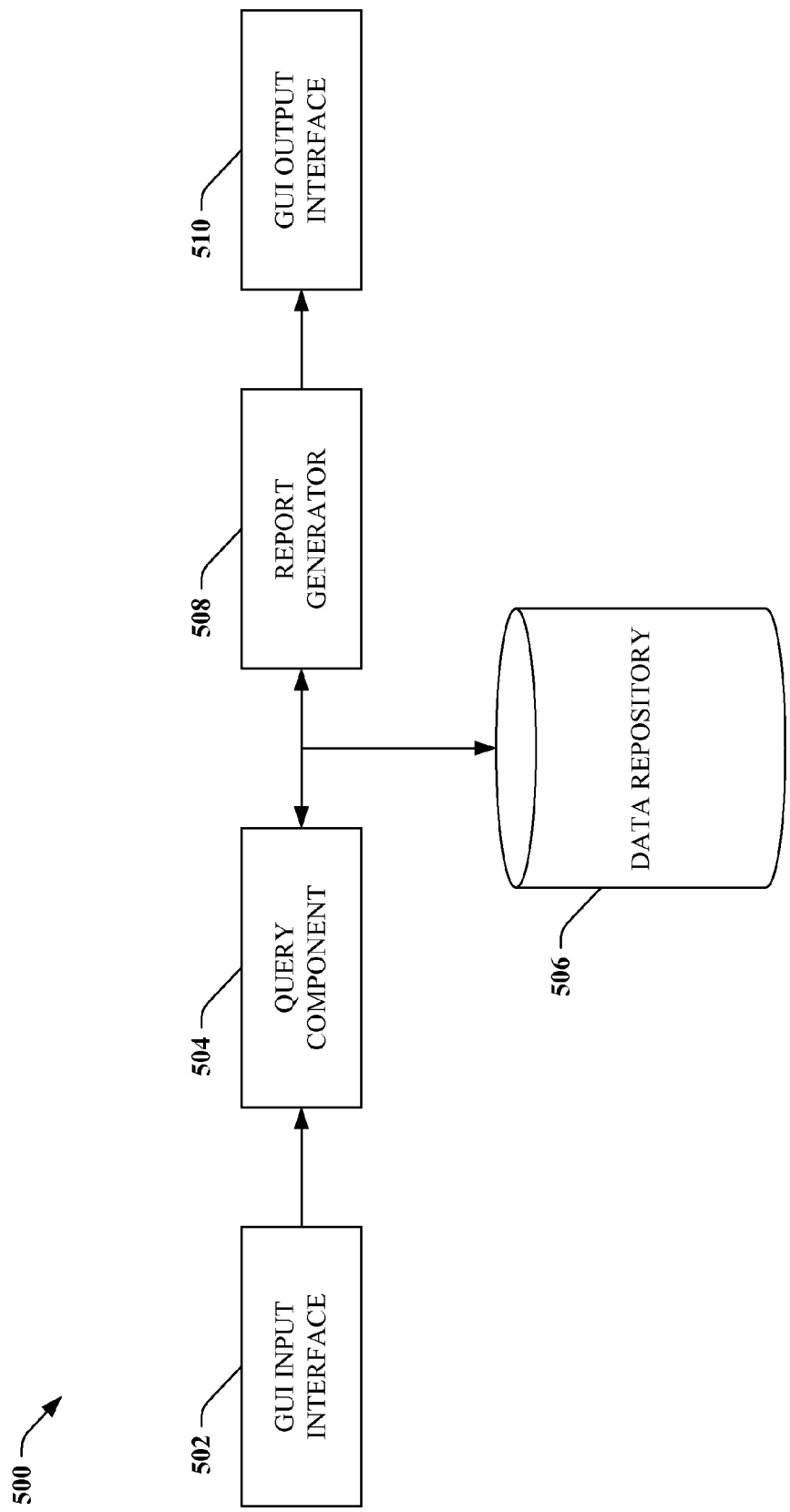
FIG. 5 a block diagram of a system that facilitates search and retrieval of search rings based on cell site information.

Referring now to FIG. 5, a block diagram of a system is depicted that can facilitate search and retrieval of search rings based on cell site information. System 500 can include a graphical user interface (GUI) input interface 502 that can receive information associated with a cell site. More particularly, the information can include latitude and longitude of a cell site, a cell site name, a SiteID, or a suitable combination thereof or of like cell site identifying information. The information can be utilized to conduct a search of one or more cell sites, distinguishing amongst cell sites based on unique parameters contained within the information.

System 500, according to particular aspects, can include a query component 504 that receives information associated with a cell site from GUI input interface 502. Further, query component 504 can extract qualifying data associated with a search ring from such information, and utilize the data to identify and retrieve the search ring from a database (e.g., data repository 506). Qualifying data can be any suitable portion of provided information that can distinguish, or qualify, one cell site from another. In effect, the query component enables an entity to filter amongst various search rings stored in data repository 506 and extract one or more particular ones there from.

According to further aspects, system 500 can identify and extract multiple search rings based on qualifying input data. For instance, a file of latitude and longitude locations (e.g., contained within a comma separated value (CSV) file, or like delimited file) or related identifying data can be received by query component 504. Query component 504 can then identify one or more (e.g., depending on the accuracy of the identifying data) stored search rings pertinent to each set of identifying data (e.g., latitude and longitude pair). As a result, a list of search strings can be provided from a database.

System 500 can also include a report generator 508 that can summarize information pertaining to one or more search strings in a document-style format. For instance, a custom search string information form can be generated and utilized to organize search string information. Further, such information can include technical information about the cell site(s) (e.g., latitude and longitude pair, location of an antenna(s), height of an antenna(s), coverage capacity, etc.), one or more maps and associated topological, geographical or GIS-related information associated therewith (e.g., see FIG. 3 and associated discussion, supra), a justification plot for the cell site (e.g., see FIG. 2 and association discussion, supra), enterprise approval information (e.g., see FIG. 4 and associated discussion, supra) and the like. The report can be an electronic document containing one or more links to additional forms containing the associated information and/or printed reports thereof. The electronic files can be presented at a GUI output interface 510, which can display the document and associated forms. The GUI output interface can optionally render maps associated with the search ring. As described, system 500 provides a significant benefit over conventional segregated (and manual) cell site proposal systems by enabling automated search, retrieval and presentation of one or more search rings contained within an enterprise database 505, as described above.

The aforementioned systems have been described with respect to interaction between several components. It should be appreciated that such systems and components can include those components or sub-components specified therein, some of the specified components or sub-components, and/or additional components. For example, a system could include receiver component 102, implementation component 104, data repository 106, and approval tracking component 408, or a different combination of these and other components. Sub-components could also be implemented as components communicatively coupled to other components rather than included within parent components. Additionally, it should be noted that one or more components may be combined into a single component providing aggregate functionality. For instance, data repository 406 can include enterprise database 410, or vice versa, to facilitate storing cell site specific information and managerial approval information by way of a single data store. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 6:
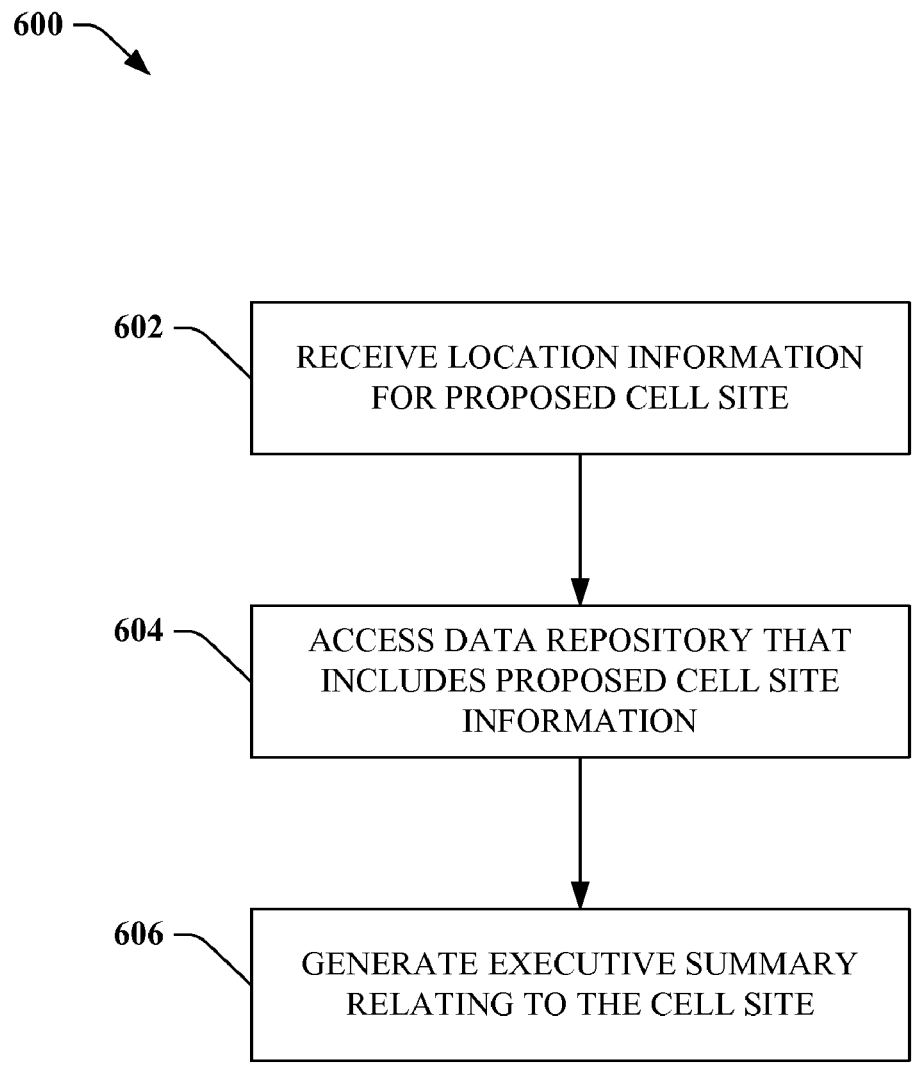
FIG. 6 is representative flow diagram illustrating a methodology for creating a cell site given location input.
Figure 7:
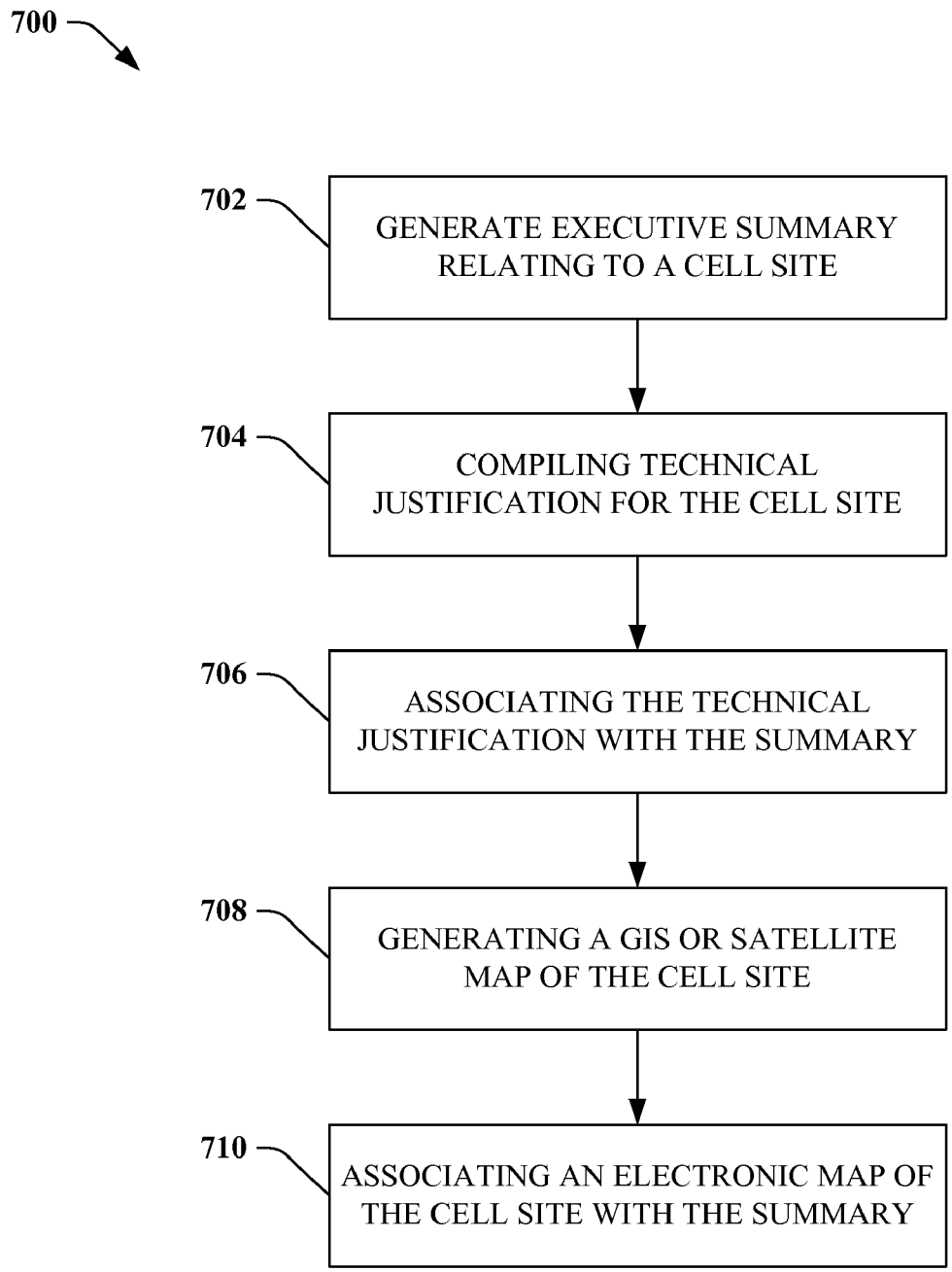
FIG. 7 is a sample flowchart diagram depicting a methodology for aggregating a justification plot and cell site map with a search ring.
Figure 8:
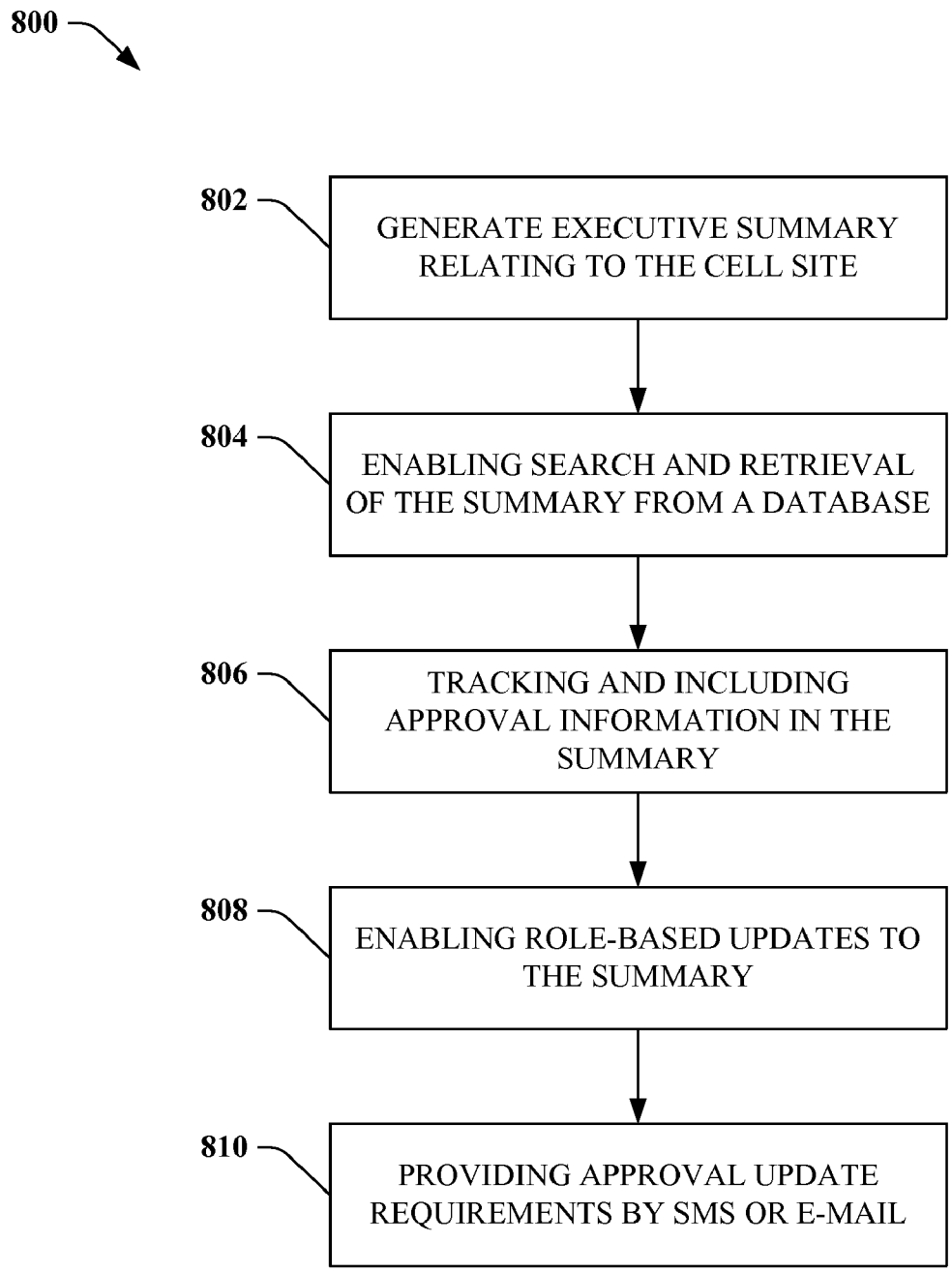
FIG. 8 is an example flowchart diagram depicting a methodology for tracking and displaying enterprise approval for a search ring in accordance with one or more aspects.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Referring now to FIG. 6, a methodology 600 relating to automatically outputting a search ring or search rings is illustrated. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Method 600, at 602, can receive location information from a proposed cell site. The location information can be in the form of a latitude/longitude, for example. At 604, a data repository is accessed, wherein the data repository includes information relating to the proposed cell site. Such information can include commands to generate a map relating to the proposed cell site, antenna type, coverage area, technical justification information, etc. At 606, an executive summary relating to the proposed cell site is created and provided to the requesting party. For instance, content of the executive summary can be customized based at least in part upon a user's role. Thus, a project manager may receive different content compared with that provided to a project engineer. Furthermore, different applications can be utilized to create and package information into the executive summary. For example, a spreadsheet document can be automatically embedded into a word processing document.

FIG. 7 is a sample flowchart diagram depicting a methodology 700 for aggregating a justification plot and cell site map with a search ring. Method 700, at 702, can generate an executive summary related to a cell site. For example, an electronic file (e.g., .CSV file) containing SiteID information (e.g., latitude/longitude pairs, site name, site mailing address, and the like) can be received and utilized to identify and extract appropriate cell site search rings from a data store. More particularly, all suitable SiteIDs in a particular region, market, etc., can be tracked and data pertaining to the SiteIDs can be compiled (e.g., from engineering, feasibility, or marketing reports, from data obtained at an online site, or the like) and stored within the database. Additionally, stored data can be organized into a particular SiteID form, providing a particular template for identified GSM or UMTS etc., SiteID data.

At 704, method 700 can compile a technical justification plot for a cell site. The technical justification plot can include information such as latitude and longitude of a site (as well as name, SiteID, mailing address, etc., for instance) location of an antenna, height of an antenna, coverage capacity, or the like. The technical justification plot can be utilized to summarize information pertinent to successful operation and maintenance of the cell site. Additionally, at 706, the technical justification plot can be associated with the executive summary for the cell site, so that an electronic search of the cell site can provide both the executive summary and the justification plot.

At 708, method 700 can generate a GIP and/or satellite map of the cell site. The GIS map can be generated by way of any suitable electronic mapping application. Such a GIS map can include geographical, topological, demographic, and/or UMTS Polygon and Morphology Type information associated with a cell site. Additionally, the GIS map can identify and label suitable antenna (e.g., base station) locations, radio network control sites, and the like. The GIS map can also include cell coverage strength indications in relation to one or more radio network antennas, and provide an indication of physical structures that can cause signal strength degradation.

A satellite map can include an image map of a cell site taken by one or more satellites. The satellite image map can be received by way of a remote interface with a satellite, or by way of a data store containing such satellite images (e.g., on the Internet). The satellite image map can pictorially represent images of buildings, parking lots, hills, mountains, forests, roads, bodies of water, residential/industrial/commercial areas, and shopping malls and like commercial complexes, and so on. Additionally, the satellite image map can be overlaid with labels identifying various features. At 710, method 700 can associate the satellite image or the GIS map of the cell site, or both, with the cell site summary. As a result, method 700 can provide for automatically incorporating pertinent technical information and location site information into a summary of a cell site to more efficiency study and develop the site.

Referring now to FIG. 8, an example flowchart diagram is depicted of a methodology 800 for tracking and displaying enterprise approval for a search ring in accordance with one or more aspects. Method 800, at 802, can generate an executive summary relating to one or more cell sites, as described herein. At 804, a search and retrieval of the summary from a database can be enabled. For instance, a .csv or related delimited file can be received, where identifying indicia pertaining to the cell site (e.g., including location or name information of one or more cell sites) are included within the file. The indicia can be utilized as qualifying criteria to distinguish one or more cell sites from others within a database. Upon identification of appropriate site(s), an executive summary for a site(s) or multiple summaries for multiple sites can be provided.

At 806, method 800 can track and include approval information within the summary. The approval information can be related to a technical, financial, and/or managerial approval process of an organization, for instance. As a particular example, a technical approval process can involve a feasibility study (e.g., based on radio coverage area, ability to support one or more antennas, ability to maintain sufficient radio network coverage around the antennas with respect to various physical buildings or landmarks, and so on) and results of such a study. A financial approval process can include marketing studies and projected revenues based on commercial, industrial and/or residential demographics pertaining to a cell site. Additionally, managerial approval can relate to regional, national and/or enterprise-level budget and expenditure analysis appropriate for a particular organization. These and like criteria can be tracked by method 800 in order to provide an up-to-date indication of pertinent activity related to cell site approval.

At 808, method 800 can enable role-based updates to the approval information in the summary. Particularly, entities responsible for certain portions of an approval process (e.g., engineering manager, marketing manager, financial officer, regional, national or enterprise-level directors, vice presidents, and so on) can be authorized to provide concurrent information of a segment of the approval process for which they are responsible for. For example, a vice president of finance may be authorized to research and provide financial justification for approval or denial of the cell site. The vice president, therefore, could be authorized to provide an update as when financial related aspects change (e.g., when prior approval is obtained so that finance is the next step in an approval process, when pertinent financial data is obtained and reviewed, when a approval decision has been made on behalf of the finance divisions, and so on).

Additionally, at 810, short message service (SMS) or e-mail messages can be automatically generated regarding approval update requirements. The messages can be sent to one or more individuals responsible for a particular approval requirement, and can also be appended to an executive summary of a cell site (e.g., in an approval log file indicating a position of a cell site in the process, and requirement notifications sent as part of the process). The notification messages can help to expedite an approval process by sending reminders of action items needed to advance approval. By automatically generating and sending these messages, time and overhead expenses can be conserved as compared with conventional, manual alternatives.

As described, method 800 provides for an efficient and automated mechanism to provide visibility for a cell site approval procedure. In addition, updates and action notifications can be automatically generated to expedite such a procedure. Consequently, method 800 provides a much more organized and efficient approval process, increasing visibility and reducing wasted time and overhead expenditures, as compared with conventional methods.

Figure 9:
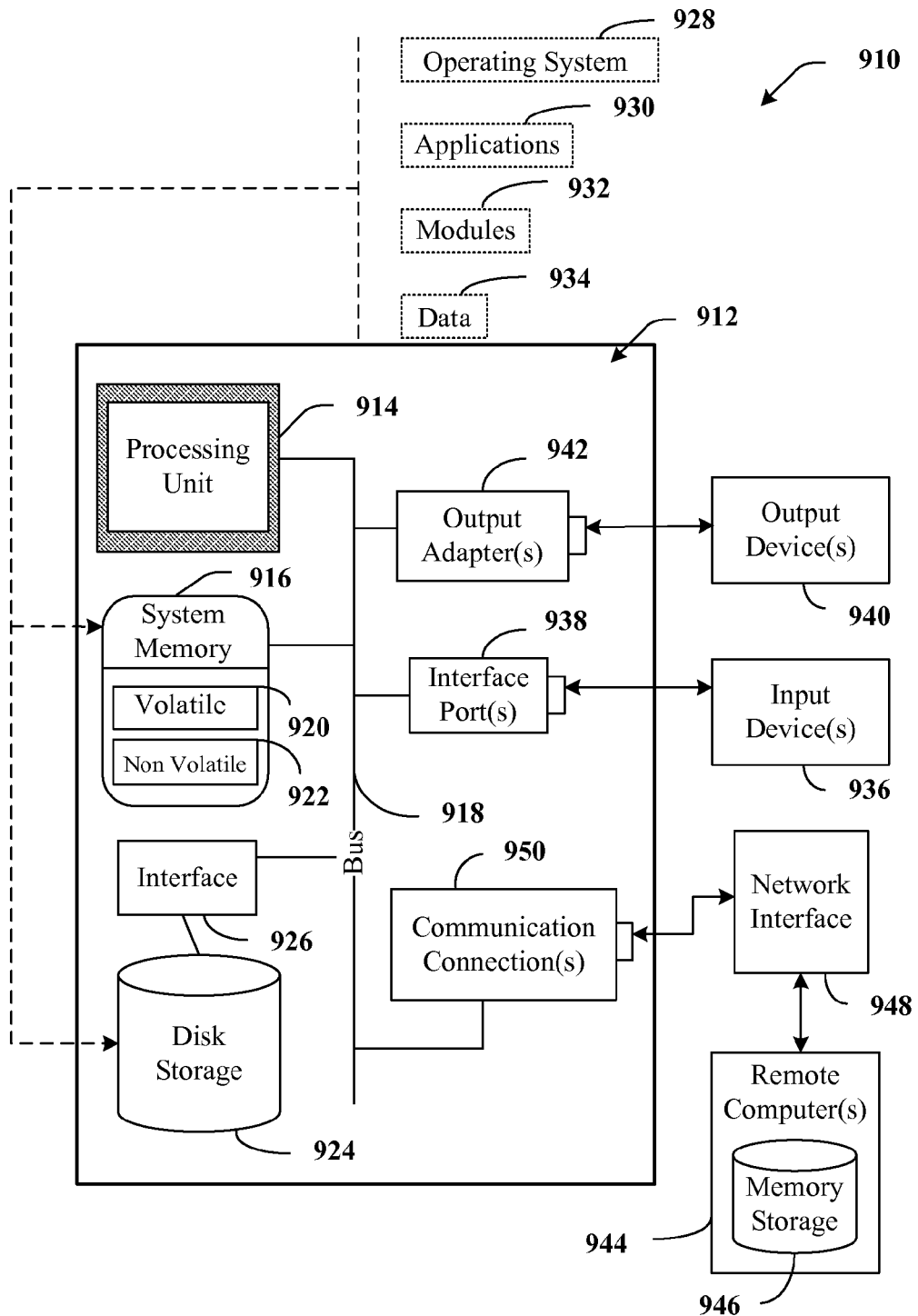
FIG. 9 is a schematic block diagram illustrating a suitable operating environment in accordance with an aspect of the present invention.
Figure 10:
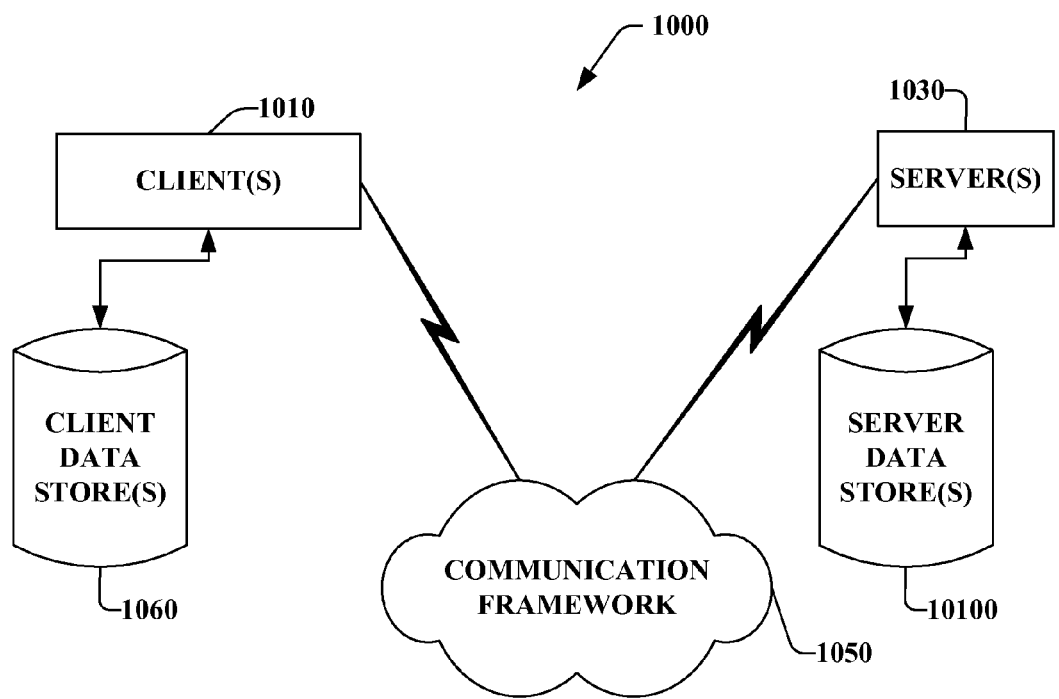
FIG. 10 is a schematic block diagram of a sample-computing environment with which the present invention can interact.

In order to provide a context for the various aspects of the invention, FIGS. 9 and 10 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 900 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example disk storage 924. Disk storage 494 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel and CRT), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The server(s) 1030 can house threads to perform transformations by employing the present invention, for example. One possible communication between a client 1010 and a server 1030 may be in the form of a data packet transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 440 that can be employed to store information local to the servers 1030.

Figure 11:
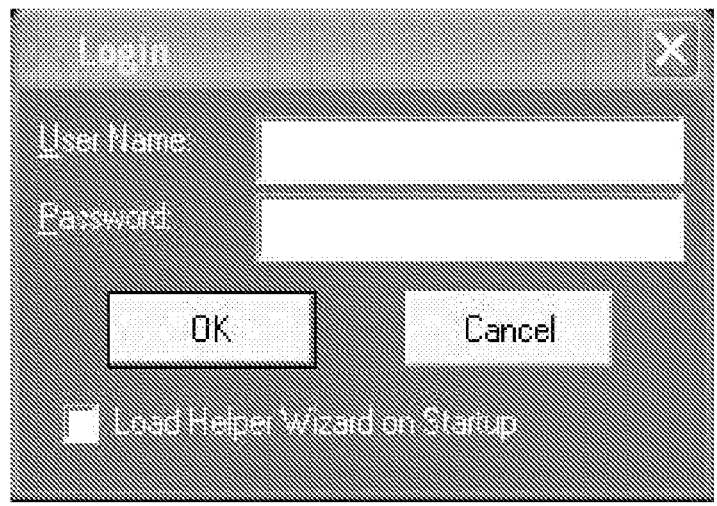
Figure 12:

Referring now to FIG. 11, a screenshot 1100 of a login screen that can be utilized to access a database tool described herein is provided. Pursuant to an example, a user can provide a username and a password and obtain access to an application interface that enables search rings to be automatically generated (including justification information). Turning now to FIG. 12, a screenshot 1200 illustrating a graphical user interface that allows a user to select a job type is depicted. In the example screenshot 1200, a user can select one of several radio buttons to select a job type.

Figure 13:
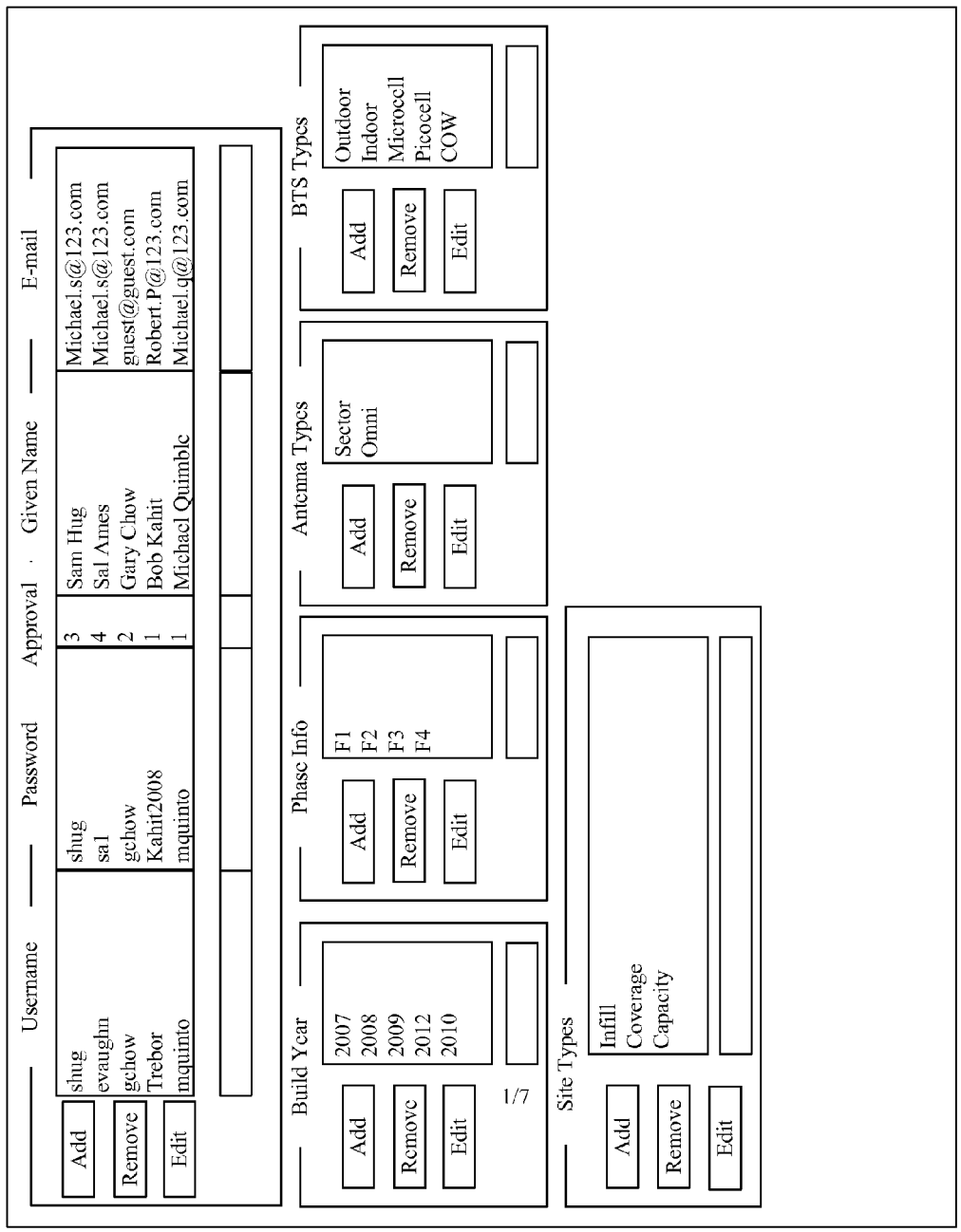

Turning now to FIG. 13, a screenshot 1300 illustrating a graphical user interface that can be utilized in connection with maintaining data associated with automatic generation of search rings is provided. The graphical user interface includes a field that comprises several selectable names and passwords, approval levels, and email addresses. Therefore, different individuals with different approval levels can be provided with different information. Furthermore, fields can be provided that enable a user to select a build year, particular phase information, antenna types, and base station types. Thus, an individual with access rights to alter data within a data repository (e.g., see data repository 106 at FIG. 1, supra) can add or modify data therein.

Figure 14:
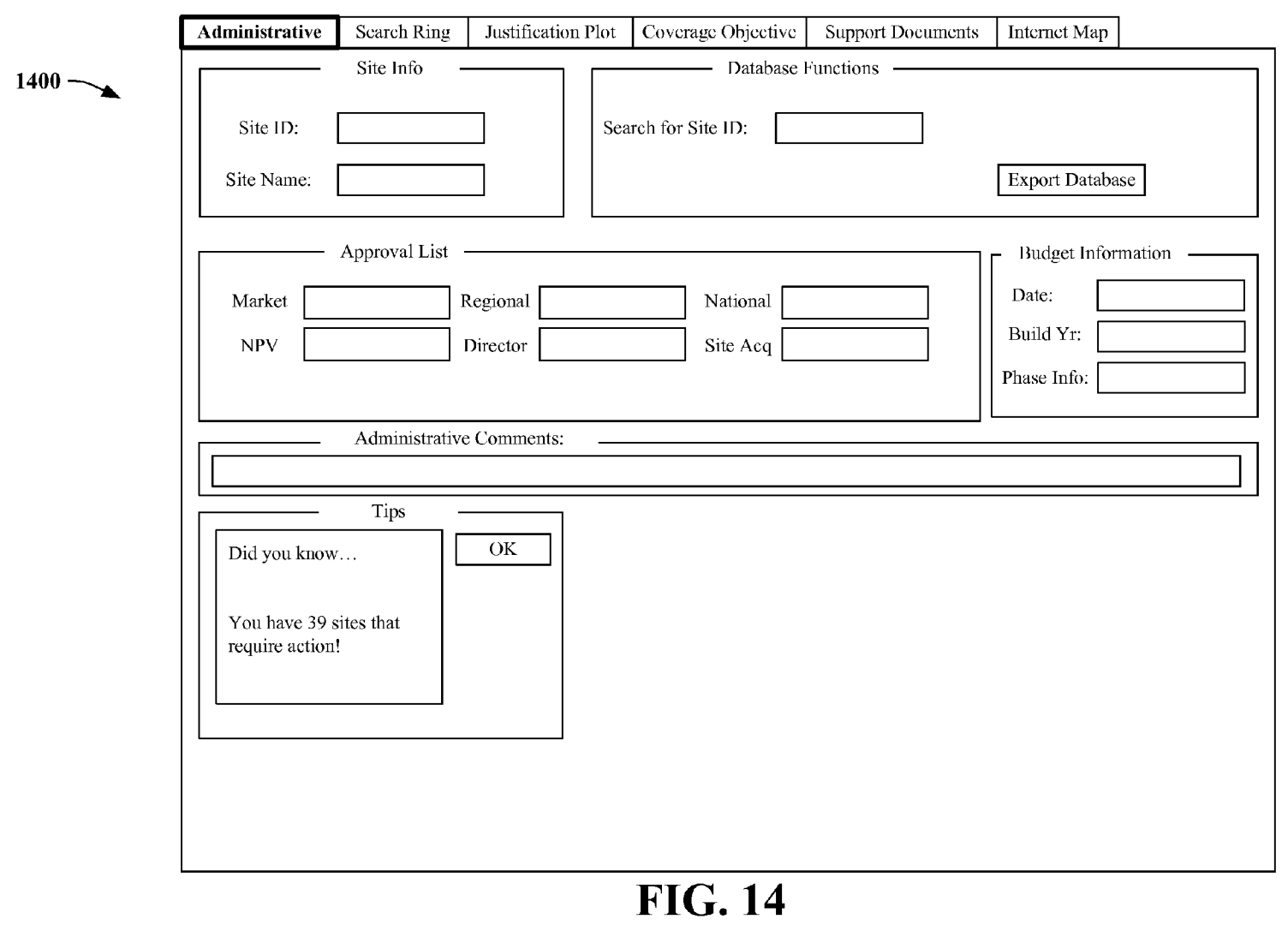

With reference now to FIG. 14, a screenshot 1400 is provided that illustrates selection of a prospective cell site. The prospective cell site can be located by searching via site identification, site name, and/or the like. Once a site is selected, fields can be populated that indicate that approval has been granted at a market level, at a regional level, at a national level, an associated net present value, a particular director that is associated with the site, and/or the like. Furthermore, tabs can be selected such that a search ring can be displayed, a site justification plot can be displayed, a coverage objective can be displayed, support documents can be provided, and a map of a region associated with the prospective cell site can be provided.

Turning now to FIG. 15, a screenshot 1500 that illustrates approval levels for a particular proposed cell site is illustrated. A graphical user interface can include a field that indicates a site identity and fields that are associated with an approval process. In the screenshot 1500, the site identifier has been approved at the market level but not at the regional level. In contrast, previously to determine where a proposed site was in an approval process, various emails and/or phone calls need to be made to determine where the proposed site resides in the approval process. In another example, an SMS text message or email can automatically be generated to notify individuals that they are required to take actions in the approval process.

Referring now to FIG. 16, a screenshot 1600 that illustrates an example search ring is provided. The search ring can include information such as site identification, site name, latitude of a site, longitude of a site, ground elevation associated with a site, radiation center related to a site, an antenna catalog, a site type, a base station type, information regarding various sectors, engineering comments, structural requirements (e.g., minimum height, maximum height, structure type, . . . ), as well as calculated information. Additionally, a plot indicating other access points can be provided.

Figure 17:
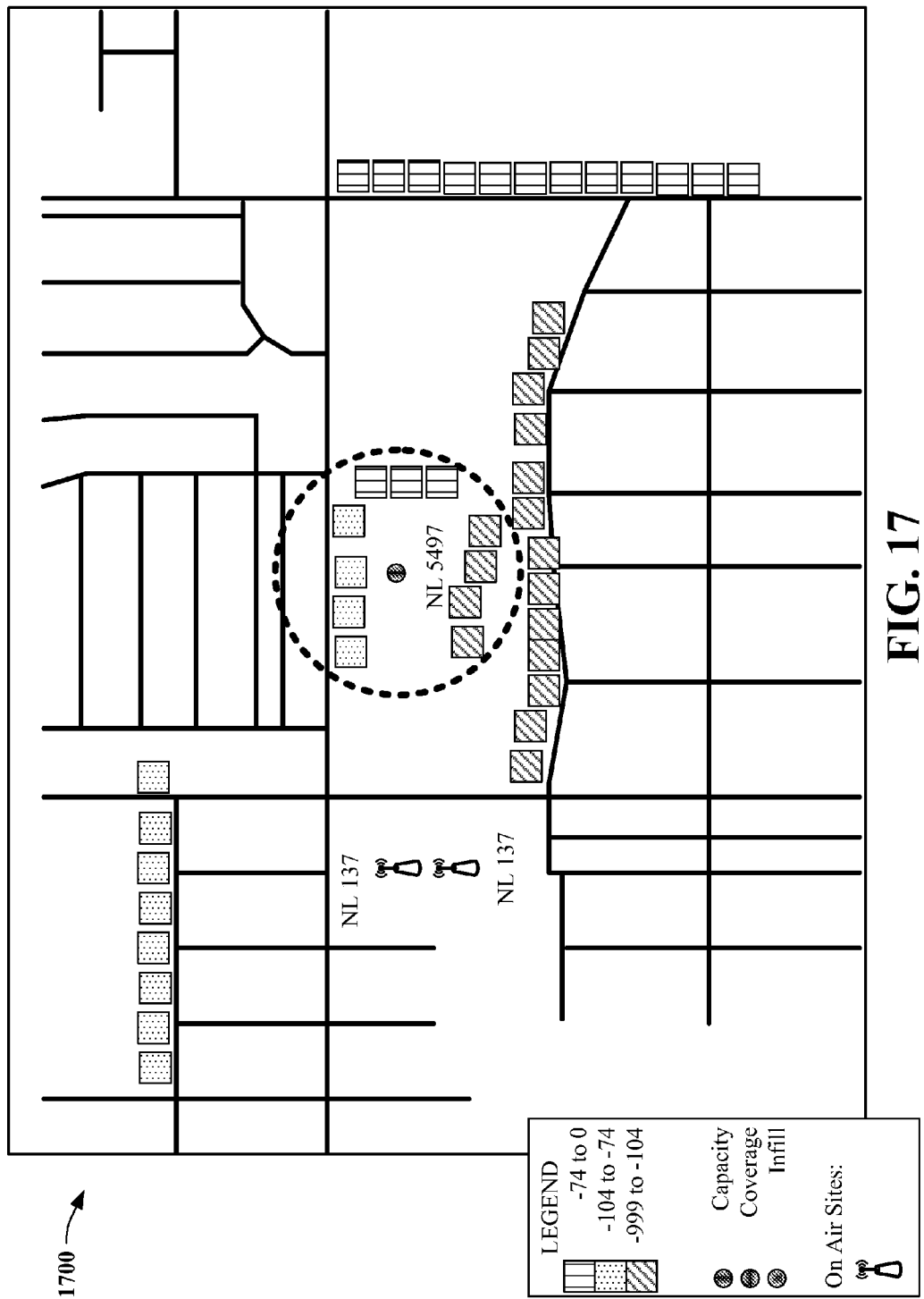
Figure 18:
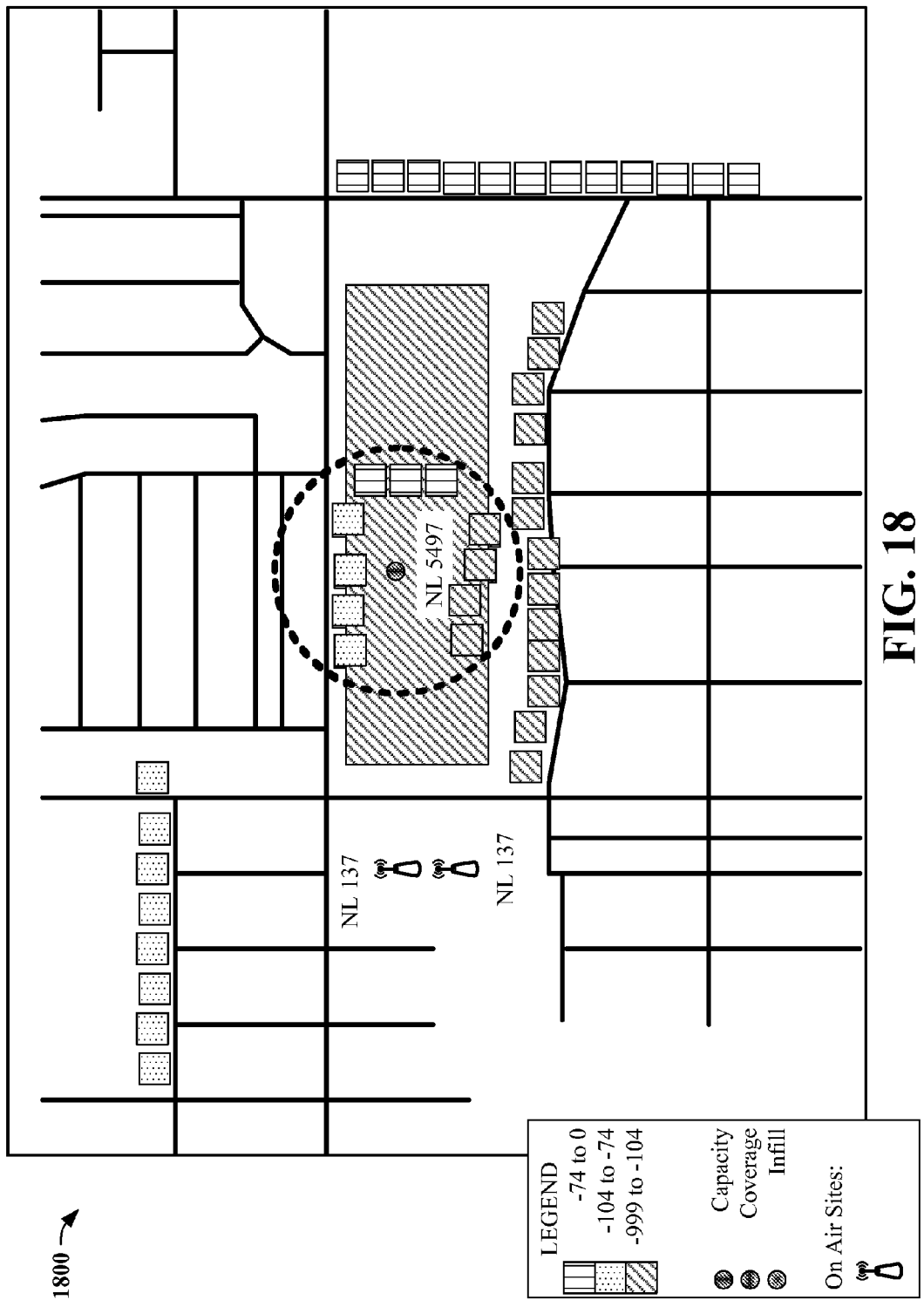
Figure 19:
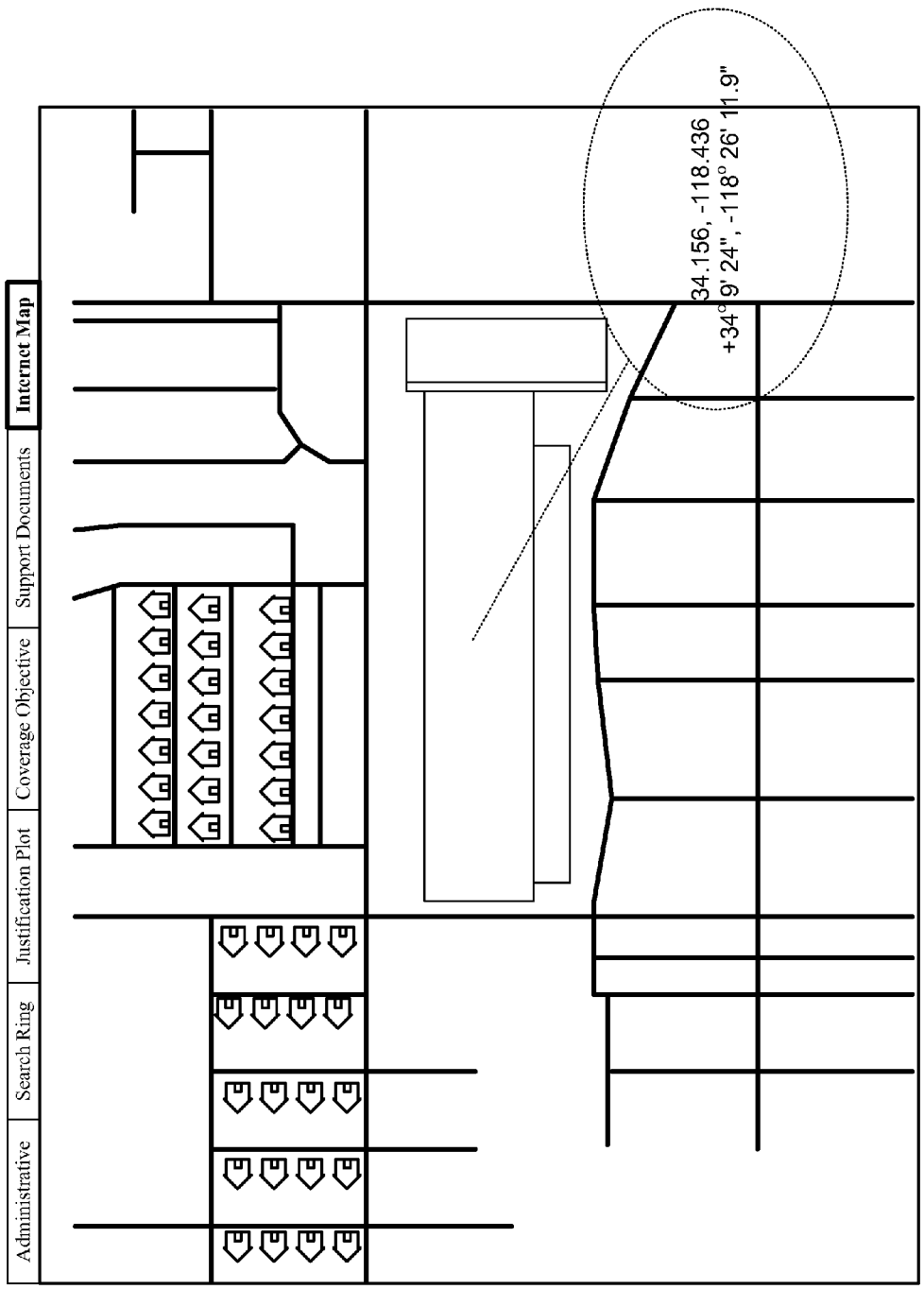

Now turning to FIG. 17, a screenshot 1700 of a justification plot for a particular proposed cell site is provided. The justification plot can convey information relating to system capacity, cell site coverage, cell site infill, and other suitable justification. With reference to FIG. 18, a screenshot 1800 of a coverage objective plot for a proposed cell site is illustrated. Again, the plot can include information relating to capacity, coverage, infill, and other suitable information. Referring now to FIG. 19, a screenshot 1900 of a satellite image of a location of the proposed cell site is provided. Thus, by quickly traversing through tabs a significant amount of information relating to a proposed cell site can be ascertained.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A search ring generation system, comprising:
   a receiver component that obtains indicia that identifies a geographic area; and
   an implementation component communicatively coupled to the receiver component and to a data store; wherein the implementation component obtains the indicia from the receiver component, and further obtains cellular network operability information from the data store that is related to integrating a proposed cell site at the geographic location within an existing cellular network, and further wherein the implementation component automatically creates a search ring document with respect to the proposed cell site.

2. The search ring generation system of claim 1, further comprising a generator component that creates a justification plot and associates the justification plot with the search ring document.

3. The search ring generation system of claim 1, further comprising a map generator component that creates a satellite map of a region associated with the search ring document.

4. The search ring generation system of claim 1, the implementation component receives identifying indicia for a plurality of proposed cell sites and generates search rings with respect to respective ones of the proposed cell sites.

5. The search ring generation system of claim 1, comprising an approval tracking component that updates the search ring document with approval information related to an approval process for the proposed cell site.

6. The search ring generation system of claim 5, the approval information includes results of a market justification analysis results of a management approval analysis, and results of an engineering feasibility analysis.

7. The search ring generation system of claim 1, comprising a query component that receives qualifying data associated with the search ring and utilizes the qualifying data to identify and retrieve the search ring from the data store.

8. The search ring generation system of claim 7, comprising a report generator that receives the search ring from the query component and provides a copy of the search ring document for review.

9. The search ring generation system of claim 1, the indicia includes location information for the proposed cell site, location and height of an antenna for the proposed cell site, and coverage capacity for the proposed cell site.

10. The search ring generation system of claim 1, comprising a database update component that enables role-based access to the data store to update information pertaining to the search ring.

11. A method for creating a search ring, comprising:
receiving indicia that identifies a geographic location for a proposed cell site with respect to a cellular network;
accessing a data repository that retains information relating to integrating the proposed cell site into the cellular network, the information includes an approval control criteria; and
automatically generating a search ring document for the proposed cell site in response to the geographic location and the information relating to integrating the proposed cell site satisfying the approval control criteria, wherein the search ring document formalizes a request for implementing a new cellular site at the geographic location.

12. The method of claim 11, further comprising associating a justification plot with the search ring document.

13. The method of claim 12, the justification plot provides technical justification for proceeding with the proposed cell site.

14. The method of claim 11, further comprising associating an electronic map with the search ring document.

15. The method of claim 11, further comprising enabling search and retrieval of the search ring document from the data repository based on receipt of a portion of the indicia.

16. The method of claim 11, further comprising generating an electronic message to notify an entity that an action is required by the entity in order to expedite an approval process for the search ring document.

17. The method of claim 11, further comprising tracking enterprise approval information pertaining to the proposed cell site and including the approval information in the search ring document.

18. The method of claim 17, the approval information includes marketing valuation data, engineering feasibility data, and management approval data pertaining to the search ring.

19. The method of claim 11, further comprising providing role based access to an enterprise database for updating approval data related to the search ring document.

20. The method of claim 11, the indicia includes location information, antenna location and height information and coverage capacity for the proposed cell site.

* * * * *